US011787709B2

(12) United States Patent
Locke et al.

(10) Patent No.: US 11,787,709 B2
(45) Date of Patent: Oct. 17, 2023

(54) GAS/LIQUID PLASMA REACTOR WITH PULSED POWER SUPPLY AND SECONDARY DIRECT CURRENT ELECTRODES

(71) Applicant: FLORIDA STATE UNIVERSITY RESEARCH FOUNDATION, INC., Tallahassee, FL (US)

(72) Inventors: Bruce R. Locke, Tallahassee, FL (US); Robert J. Wandell, Tallahassee, FL (US); Youneng Tang, Tallahassee, FL (US)

(73) Assignee: FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 297 days.

(21) Appl. No.: 17/212,244

(22) Filed: Mar. 25, 2021

(65) Prior Publication Data

US 2021/0206667 A1 Jul. 8, 2021

Related U.S. Application Data

(62) Division of application No. 16/514,704, filed on Jul. 17, 2019, now Pat. No. 10,988,390.

(60) Provisional application No. 62/738,358, filed on Sep. 28, 2018.

(51) Int. Cl.
*C02F 1/46* (2023.01)
*C02F 1/70* (2023.01)
*H05H 1/48* (2006.01)
*C02F 101/36* (2006.01)
*C02F 103/06* (2006.01)

(52) U.S. Cl.
CPC .............. *C02F 1/4608* (2013.01); *C02F 1/70* (2013.01); *H05H 1/48* (2013.01); *C02F 2101/36* (2013.01); *C02F 2103/06* (2013.01); *C02F 2201/46* (2013.01)

(58) Field of Classification Search
CPC .. C02F 1/46; C02F 1/4608; C02F 1/70; C02F 2101/36; C02F 2103/06; C02F 2201/46; H05H 1/48
USPC ....................................................... 588/311
See application file for complete search history.

(56) References Cited

U.S. PATENT DOCUMENTS

| 1,708,126 | A | 4/1929 | Esmarch |
| 2,045,343 | A | 6/1936 | Darrah |
| 3,205,162 | A | 9/1965 | Maclean |
| 3,497,436 | A | 2/1970 | Yates et al. |
| 4,141,715 | A | 2/1979 | Wyse et al. |
| 4,297,123 | A | 10/1981 | Wyse et al. |
| 4,456,512 | A | 6/1984 | Bieler et al. |
| 4,926,001 | A | 5/1990 | Alagy et al. |
| 6,228,266 | B1 | 5/2001 | Shim |
| 6,909,505 | B2 | 6/2005 | Lucas et al. |
| 6,923,890 | B2 | 8/2005 | Ricatto et al. |
| 7,122,166 | B2 | 10/2006 | Parrish |
| 7,378,062 | B2 | 5/2008 | Itatani |
| 7,604,719 | B2 | 10/2009 | Vanden Bussche et al. |
| 7,919,053 | B2 | 4/2011 | Burlica et al. |
| 8,444,924 | B2 | 5/2013 | Burlica et al. |
| 9,861,950 | B2 | 1/2018 | Locke et al. |
| 10,350,572 | B2 | 7/2019 | Locke et al. |
| 10,556,817 | B2 | 2/2020 | Locke et al. |
| 10,589,252 | B2 | 3/2020 | Locke et al. |
| 10,988,390 | B2 * | 4/2021 | Locke .................. C02F 1/4608 |
| 2004/0116752 | A1 | 6/2004 | Giapis et al. |
| 2006/0060464 | A1 | 3/2006 | Chang |
| 2007/0167638 | A1 | 7/2007 | Brophy et al. |
| 2008/0286169 | A1 | 11/2008 | Meillot |
| 2009/0004074 | A1 | 1/2009 | Tonkovich et al. |
| 2009/0297406 | A1 | 12/2009 | Okino et al. |
| 2010/0220182 | A1 | 9/2010 | Krull |
| 2011/0026657 | A1 | 2/2011 | Laberge et al. |
| 2012/0000787 | A1 | 1/2012 | Santilli |
| 2021/0331135 | A1 | 10/2021 | McEnaney et al. |
| 2021/0360847 | A1 | 11/2021 | McEnaney et al. |

FOREIGN PATENT DOCUMENTS

| CA | 1069857 A | 1/1980 |
| GB | 787748 A | 12/1957 |
| GB | 896113 A | 5/1962 |
| GB | 966406 A | 8/1964 |
| WO | 2012126095 A1 | 9/2012 |
| WO | 2013052548 A2 | 4/2013 |
| WO | 2016096751 A1 | 6/2016 |

OTHER PUBLICATIONS

Esler, "Concerning Recalcitrant/Refractory Organic Species and Chemical Oxygen Demand (COD) analysis by two different methods: (a) CODCr (the dichromate method) and (b) TiO2/UV photoelectrochemistry (the PeCOD™ method)", Aqua Diagnostic 2008.

Montes-Grajales D et al.: "Occurrence of personal care products as emerging chemicals of concern in water resources: A review" 2017 Science of the Total Environment 595 601-14.

(Continued)

*Primary Examiner* — Edward M Johnson
(74) *Attorney, Agent, or Firm* — FOX ROTHSCHILD LLP

(57) ABSTRACT

A method for reacting a liquid phase chemical species includes the steps of providing liquid phase containing at least one liquid phase chemical species, providing a gas phase, and providing a reactor vessel for containing the liquid phase and the gas phase. The liquid phase and the gas phase are placed in the reactor vessel so as to form a liquid-gas interface between the liquid phase and the gas phase within the reactor vessel. A pulsed discharge cathode and anode are provided for creating a pulsed discharge electric field at the liquid-gas interface. A pulsed power input to the pulsed discharge cathode and anode is provided, thereby creating a plasma comprising ions at the liquid-gas interface. A secondary electric field is directed transverse to the liquid-gas interface, wherein the secondary electric field will drive ions from the gas phase into the liquid phase to react with the liquid phase species.

19 Claims, 4 Drawing Sheets

(56) References Cited

OTHER PUBLICATIONS

Mompelat S et al. "Occurrence and fate of pharmaceutical products and by-products, from resource to drinking water" 2009 Environment International 35 803-14.

Macedo S et al.: "Methyl-triclosan and triclosan impact embryonic development of Danio rerio and Paracentrotus ividus" 2017 Ecotoxicology 26 482-9.

Khetan S K et al.: "Human pharmaceuticals in the aquatic environment: A challenge to green chemistry Chemical Reviews" 2007 107 2319-64.

Jaramillo-Sierra et al., "Degradation of m-cresol in aqueous solution by dielectric barrier discharge," Journal of Physics; Conference Series 406 (2012) 012025.

Rumbach et al., "Decoupling Interfacial Reactions between Plasmas and Liquids: Charge Transfer vs Plasma Neutral Reactions," J. Am. Chem. Soc. 2013, 135, pp. 16264-16267.

Kuroki et al., "Decomposition of Trace Phenol in Solution Using Gas-Liquid Interface Discharge," Japanese J. of Appl. Phys. vol. 45, No. 5A, 2006, pp. 4296-4300.

Ognier et al., "Analysis of Mechanisms at the Plasma-Liquid Interface in a Gas-Liquid Discharge Reactor Used for Treatment of Polluted Water," Plasma Chem. Plasma Process (2009) 29:261-273.

Magureanu et al., "Degradation of pharmaceutical compound pentoxifylline in water by non-thermal plasma treatment," Water Research 44 (2010) pp. 3445-3453.

Magureanu et al., "Degradation of antibiotics in water by non-thermal plasma treatment," Water Research 45 (2011) pp. 3407-3416.

Lukes et al., "Hydrogen Peroxide and Ozone Formation in Hybrid Gas-Liquid Electrical Discharge Reactors," IEEE Trans. Ind. Appl., vol. 40, No. 1, Jan./Feb. 2004, pp. 60-67.

Locke et al., "Elementary Chemical and Physical Phenomena in Electrical Discharge Plasma in Gas-Liquid Environments and in Liquids," Ch. 6, pp. 185-241 of Plasma Chemistry and Catalysis in Gases and Liquids, 1st ed., Parvulescu et al eds., 2012.

Mora et al., "Selectivity control in a microwave surface-wave plasma reactor for hydrocarbon conversion", Plasma Processes and Polymers (2011) 8: 709-717.

Nozaki et al., "A single step methane conversion into synthetic fuels using microplasma reactor", Chemical Engineering Journal (2011) 166: 288-293.

Nozaki et al., "Innovative methane conversion technology using atmospheric pressure non-thermal plasma", Journal of the Japan Petroleum Institute (2011) 54: 146-158.

Nozaki et al., "Micro-plasma technology—direct methane to-m ethanol in extremely confined environment", Natural Gas Conversion VII (2004) 147: 505-510.

Nozaki et al., "Partial oxidation of methane using microscale non-equilibrium plasma reactor", Catalysis Today (2004) 98: 607-616.

Nozaki et al., "Selective conversion of methane to synthetic fuels using dielectric barrier discharge contacting liquid film", Journal of Physics D—Applied Physics (2011) 44.

Okazaki et al., "Direct conversion from methane to methanol for high efficiency energy system with exergy regeneration", Energy Conversion and Management (2002) 43: 1459-1468.

Patino et al., "Oxidation of cycloalkanes and diesel fuels by means of oxygen low pressure plasmas", Energy & Fuels (2002) 16: 1470-1475.

Patino et al., "Upgrading of diesel fuels and mixtures of hydrocarbons by means of oxygen low pressure plasmas: A comparative study", Fuel (2003) 82:1613-1619.

Perevezentsev et al., "Transformations of benzene-argon mixture in barrier discharge", High Energy Chemistry (2011) 45: 62-65.

Prieto et al., "Nonthermal plasma reactors for the production of light hydrocarbon olefins from heavy oil", Brazilian Journal of Chemical Engineering (2003) 20: 57-61.

Prieto et al., "Reforming of heavy oil using nonthermal plasma", IEEE Transaction on Industry Applications (2001) 37: 1464-1467.

Rasmussen et al., "Direct partial oxidation of natural gas to liquid chemicals: Chemical kinetic modeling and global optimization", Industrial & Engineering Chemistry Research (2008) 47: 6579-6588.

Sedelmeier et al., "KMn04-mediation oxidation as a continuous flow process", Organic Letters (2010) 12: 3618-3621.

Sekiguchi et al., "Direct hydroxylation of benzene using micro plasma reactor", Kagaku Kogaku Ronbunshu (2004) 30: 183-185. (abstract translation).

Shul'pin et al., "Alkane oxygenation with $H_2O_2$ catalysed by $FECl_3$ and 2,2'-bipyridine", Tectrahedron Letters (2005) 46: 4563-4567.

Sivaramakrishnan et al., "Rate constants for OH with selected large alkanes: Shock-tube measurements and an Improved group scheme", Journal of Physical Chemistry A (2009) 113: 5047-5060.

Sprengnether et al., "Rate constants of nine C6-C9 alkanes with OH from 230 to 379 K: Chemical tracers for OH", Journal of Physical Chemistry A (2009) 113: 5030-5038.

Sugai et al., "Improvement of efficiency for decomposition of organic compounds in water using pulsed streamer discharge in air with water droplets by increasing residence time", Pulsed Power Conference (2009): 1056-1060.

Suhr et al., "Organic syntheses under plasma conditions", Pure and Applied Chemistry (1974) 39: 395-414.

Suss-Fink et al., "Alkane oxidation with hydrogen peroxide catalyzed homogeneously by vanadium-containing bolyphosphomolybdates", Applied Catalysis A—General (2001) 217: 111-117.

Suzuki et al., "Investigation of a pulse circuit design and pulse condition for the high energy efficiency on water treatment using pulsed power discharge in a water droplet spray", IEEE Transactions on Dielectrics and Electrical Insulation (2011) 18: 1281-1286.

Takale et al., "Oxidation of dihydrazones of diarylacetylenes using sodium periodate", Chemistry Letters (2010) 39: 1279-1280.

Tezuka et al., "Oxidation of aromatic hydrocarbons with oxygen in a radiofrequency plasma", Plasma Chemistry and Plasma Processing (1996) 16:329-340.

Tezuka et al., "Oxidation of cycloalkanes in a radiofrequency plasma", Bulletin of Chemical Society of Japan (1991) 64: 1063-1065.

Thagard et al., "Electrical discharges in polar organic liquids", Plasma Processes and Polymers (2009) 6: 741-750.

Thornton et al., "Hydrazine synthesis in silent electrical discharge", Advances in Chemistry Series (1969): 165.

Thornton et al., "Hydrazine synthesis in silent electrical discharge", Nature (1967) 213: 1118.

Thornton et al., "Synthesis of formaldehyde from methane in electrical discharges", Nature (Feb. 11, 1967) 213: 590-591.

Sergio et al., "Synthesis of formaldehyde from methane and water in an electrical discharge 2-phase reactor", Journal of Applied Chemistry (1967) 17:325.

Wilson et al., "Measurement and estimation of rate constants for the reactions of hydroxyl radical with several alkanes and cycloalkanes", Journal of Physical Chemistry A (2006) 110: 3593-3604.

Yaji Ma et al., "Oxidation reactions of aromatic ethenes in solution exposed to low-temperature oxygen plasma", Journal of Photopolymer Science and Technology (2007) 20: 235-238.

Yamamoto et al., "Wet type plasma reactor for incinerator", Conference Record of the 1998 IEEE Industry Applications Conference (1998) 1-3: 1861-1864.

Bresch et al.: "Oxidized Derivatives of n-Hexane from a Water/Argon Continuous Flow Electrical Discharge Plasma Reactor", Plasma Chemistry and Plasma Processing, 35(6) (2015) 553-584.

Hisieh et al.: "Analysis of a gas-liquid film plasma reactor for organic compound oxidation", Journal of Hazardous Materials 317 (2016) 188-197.

Hsieh et al.: "Analysis of hydroxyl radical formation in a gas liquid electrical discharge plasma reactor utilizing liquid and gaseous radical scavengers", Plasma Processes and Polymers, 14(8) e1600171 (2017).

Ammary, "Nutrients requirements in biological industrial wastewater treatment", African Journal of Biotechnology vol. 3 (4), pp. 236-238, Apr. 2004.

(56) References Cited

OTHER PUBLICATIONS

Yang et al.: "Occurrences and removal of pharmaceuticals and personal care products (PPCPs) in drinking water and water/sewage treatment plants: A review", Science of the Total Environment 596-597 (2017) 303-320.
Edward Archer et al.: "The fate of pharmaceuticals and personal care products (PPCPs), endocrine disrupting contaminants (EDCs), metabolites and illicit drugs in a WWTW and environmental waters", Chemosphere 174 (2017) 437-446.
Deblonde et al.: "Emerging pollutants in wastewater: A review of the literature" 2011 International Journal of Hygiene and Environmental Health 214 442-8.
Geissen et al.: 2015 Emerging pollutants in the environment: A challenge for water resource management International Soil and Water Conservation Research 3 57-65.
Fujii et al.: 2007 New POPs in the water environment: distribution, bioaccumulation and treatment of perfluorinated compounds—a review paper Journal of Water Supply Research and Technology—Aqua 56 313-26.
Santafe-Moros et al.: "Performance of commercial nanofiltration membranes in the removal of nitrate ions", Desalination 2005, 185 (1-3), 281-287.
Guo et al.: "Nanofiltration for drinking water treatment: a review", Frontiers of Chemical Science and Engineering. 16 (5): 681-698.
International Search Report dated Jun. 9, 2015 in International Application No. PCT/US2015/020475.
Agiral et al., "Gas-to-liquids process using multi-phase flow, non-thermal plasma microreactor", Chemical Engineering Journal (2011) 167: 560-566.
Akiyama, "Streamer discharges in liquids and their applications", IEEE Transactions on Dielectrics and Electrical Insulation (2000) 7: 646-653.
Bie et al., "Dielectric barriers discharges used for the conversion of greenhouse gases: Modeling the plasma chemistry by fluid simulations", Plasma Sources Science & Technology (2011) 20(2): 024008. (12 pages).
Bie et al., "Fluid modeling of the conversion of methane into higher hydrocarbons in an atmospheric pressure dielectric barrier discharge", Plasma Processes and Polymers (2011) 8: 1033-1058.
Bruggeman et al., "Non-thermal plasmas in and in contact with liquids", Journal of Physics D: Applied Physics (2009) 42: 1-28.
Burlica et al., "Formation of H2 and H2O2 in water-spray gliding arc nonthermal plasma reactor", Industrial & Engineering Chemistry Research (2010) 49(14): 6342-6349.
Burlica et al., "Hydrogen generation by pulsed gliding arc discharge plasma with sprays of alcohol solutions", Industrial & Engineering Chemistry Research (2011) 50: 9466-9470.
Burlica et al., "Pulsed plasma gliding arc discharges with water spray", IEEE Transactions on Industry Applications (2008) 44: 482-489.
Davies et al., "Glow-discharge electrolysis. Part I. The Anodic formation of hydrogen peroxide in inert electrolytes", Journal of the Chemical Society, Faraday Transactions (Sep. 1952): 3595-3602.
Friedrich, "Mechanisms of plasma polymerization—Reviewed from a chemical point of view", Plasma Processes and Polymers (2011) 8: 783-802.
Gambus et al., "Oxidation of long chain hydrocarbons by means of low-pressure plasmas", Energy & Fuels (2001) 15: 381-886.
Gesser et al., "The direct conversion of methane to methanol by controlled oxidation", Chemical Reviews (1985) 85: 235-244.
Goujard et al., "Plasma-assisted partial oxidation of methane at low temperatures: Numerical analysis of gas-phase chemical mechanism", Journal of Physics D—Applied Physics (2011) 44(27): 274011. (13 pages).
Hickling et al., "Contact glow-discharge electrolysis", Transactions of the Faraday Society (1964) 60: 783-793.
Hickling, "Electrochemical processes in glow discharge at the gas-solution interface", Modem Aspects of Electrochemistry (1971) 6: 329-373.

Hijikata et al., "Methanol conversion from methane and water vapor by electric discharge (effect of electric discharge process on methane conversion)", Heat Transfer Asian Research (1999) 28: 404-417.
Honorato et al., "(1)H low- and high-field NMR study of the effects of plasma treatment on the oil and water fractions in crude heavy oil", Fuel (2012) 92: 62-68.
Hsieh et al., "Optical diagnostics of electrical discharge water-spray reactors for chemical synthesis", IEEE Transactions on Industry Applications (2013) 49: 305-310.
Hueso et al., "Water plasmas for the revalorisation of heavy oils and cokes from petroleum refining", Environmental Science & Technology (2009) 43: 2557-2562.
Indarto, "A review of direct methane conversion to methanol by dielectric barrier discharge", IEEE Transactions on Dielectrics and Electrical Insulation (2008) 15: 1038-1043.
Jannini et al., "Hydrogen peroxide oxidation of alkanes catalyzed by the vanadate ion-pyrazine-2-carboxilic acid system", Petroleum Chemistry (2005) 45: 413-418.
Jia et al., "Catalytic functionalization of arenes and alkanes via C-H bond activation", Accounts of Chemical Research (2001) 34: 633-639.
Kamata et al., "Efficient stereo- and regioselective hydroxylation of alkanes catalysed by a bulky poloxometalate", Nature Chemistry (2010) 2: 478-483.
Khani et al., "Investigation of cracking by cylindrical dielectric barrier discharge reactor on the n-hexadecane as a model compound", IEEE Transactions on Plasma Science (2011) 39: 1807-1813.
Kobayashi et al., "The effect of spraying of water droplets and location of water droplets on the water treatment by pulsed discharge in air", IEEE Transactions on Plasma Science (2010) 38: 2675-2680.
Kozlov et al., "The kinetics and mechanisms of cyclohexane oxygenation by hydrogen peroxide catalyzed by a binuclear iron complex", Russian Journal of Physical Chemistry (2003) 77: 575-579.
Kudryashov et al., "Oxidation of hydrocarbons in a barrier discharge reactor", High Energy Chemistry (2000) 34: 112-115.
Kudryashov et al., "Oxidation of hydrocarbons in a bubble plasma reactor", Petroleum Chemistry (2004) 44: 438-440.
Kudryashov et al., "Oxidation of propylene and isobutylene in a reactor with barrier discharge", Russian Journal of Applied Chemistry (2004) 77: 1904-1906.
Kudryashov et al., "Oxidation of propylene with air in barrier discharge in the presence of octane", Russian Journal of Applied Chemistry (2011) 84: 1404-1407.
Kudryashov et al., "Oxidative conversion of cyclohexane in discharge plasma maintained with different high-voltage power sources", High Energy Chemistry (2008) 42: 51-55.
Kudryashov et al., "Simulation of the kinetics of cyclohexane oxidation in a barrier discharge reactor", High Energy Chemistry (2002) 36: 349-353.
Kudryashov et al., "Study of the products of Benzene Transformation in the presence of argon, hydrogen, and propane-butane mixture in barrier discharge", Petroleum Chemistry (2012) 52: 60-64.
Kudryashov et al., "Transformations of n-hexane and cyclohexane by barrier discharge processing in inert gases", High Energy Chemistry (2001) 35: 120-122.
Labinger et al., "Understanding and exploiting C-H bond activation", Nature (2002) 417: 507-514.
Lee et al., "The characteristics of direct hydroxylation of benzene to phenol with molecular oxygen enhanced by pulse DC corona at atmospheric pressure", Plasma Chemistry and Plasma Processing (2003) 23: 519-539.
Locke et al., "Electrohydraulic discharge and nonthermal plasma for water treatment", Industrial & Engineering Chemistry Research (2006) 45:882-905.
Locke et al., "Elementary chemical and physical phenomena in electrical discharge plasma in gas-liquid environments and in liquids", Plasma Chemistry and Catalysis in Gases and Liquids (2012).

(56) References Cited

OTHER PUBLICATIONS

Locke et al., "Review of the methods to form hydrogen peroxide in electrical discharge plasma with liquid water", Plasma Sources Science and Technology (2011) 20: 034006.

Lukes et al., "Aqueous-phase chemistry of electrical discharge plasma in water and in gas-liquid environments", Plasma Chemistry and Catalysis in Gases and Liquids (2012) 1st ed. (ch. 7): 243-308.

Lukes et al., "Biological effects of electrical discharge plasma in water and in gas-liquid environments", Plasma Chemistry and Catalysis in Gases and Liquids (2012) 1st ed. (ch. 8): 309-352.

Malik et al., "Preliminary studies on formation of carbonaceous products by pulsed spark discharges in liquid Hydrocarbons", Journal of Electrostatics (2008) 66: 574-577.

Malik et al., "Water purification by electrical discharges", Plasma Sources Science and Technology (2001) 10: 82-91.

Malik et al., "Water purification by plasmas: Which reactors are most energy efficient", Plasma Chemistry and Plasma Processing (2010) 30: 21-31.

Mandelli et al., "Hydrogen peroxide oxygenation of saturated and unsaturated hydrocarbons catalyzed by montmorillonite or aluminum oxide", Catalysis Letters (2009) 132: 235-243.

Monod et al., "Structure-activity relationship for the estimation of OH-oxidation rate constants of aliphatic organic compounds in the aqueous phase: Alkanes, alcohols, organic acids and bases", Atmospheric Environments (2008) 42: 7611-7622.

\* cited by examiner

GAS/LIQUID PLASMA REACTOR WITH PULSED POWER SUPPLY AND SECONDARY DIRECT CURRENT ELECTRODES

CROSS-REFERENCE TO RELATED APPLICATIONS

This application is a divisional application of U.S. patent application Ser. No. 16/514,704 filed Jul. 17, 2019, which claims priority to U.S. Provisional Patent Application No. 62/738,358 filed Sep. 28, 2018, entitled Gas/Liquid Plasma Reactor With Pulsed Power Supply and Secondary Direct Current Electrodes," the entireties of which are hereby incorporated herein by reference.

STATEMENT REGARDING FEDERALLY SPONSORED RESEARCH AND DEVELOPMENT

This invention was made with government support under Contract No. CBET1702166 awarded by the National Science Foundation. The government has certain rights in this invention.

FIELD OF THE INVENTION

The present invention relates generally to plasma reactors, and more particularly to plasma reactors for reacting liquid, gas, and/or liquid-gas interfacial chemical species.

BACKGROUND OF THE INVENTION

Per- and poly-fluoroalkyl substances (PFAS) are a group of approximately 5,000 human-derived chemicals that are used in consumer products such as cookware, food packaging, and carpets, and in industrial applications such as fire-fighting foam, food processing, and electronics manufacturing. Many consumer goods containing or pretreated with PFAS are eventually disposed of at municipal solid waste (MSW) landfills. Some discarded PFAS-containing products (e.g., carpeting) may be sent to industrial RCRA (Resource Conservation and Recovery Act) non-hazardous or construction and demolition landfills. Due to the strong carbon-fluorine (F—C) bonds PFAS do not degrade like other waste components, and thereby appear in the landfill leachate. Most modern landfills are designed with leachate collection systems to collect leachate for treatment and engineered barrier (liners) to prevent leachate from contaminating the groundwater.

According to a recent study by the Environmental Research & Education Foundation, the majority (~62%) of landfills send the collected leachate to wastewater treatment plants (WWTPs) via sewers or trucks, a small portion of the landfills (~6%) fully treat the leachate on site, and other landfills (~32%) dispose of the leachate through other methods such as deep well injection and leachate recirculation. Sending leachate to WWTPs without pretreatment has been preferred for its easy maintenance and low operating costs. However, WWTP managers are becoming reluctant to accept non-pretreated leachate due to the increasingly stringent regulations on wastewater discharge. Therefore, the need for leachate pretreatment prior to releasing to WWTPs will likely increase in the future.

The PFAS' persistence, combined with their mobility and potential hazards to human, presents serious leachate treatment and disposal challenges. The United States Environmental Protection Agency (USEPA) has established the health advisory levels at 70 parts per trillion for two commonly found PFAS: perfluorooctanoic acid (PFOA) and perfluorooctane sulfonic acid (PFOS), and initiated the steps to evaluate the need for an Maximum Contaminant Level. It is desirable to remove PFAS in landfills rather than in WWTPs or drinking water treatment plants (DWTPs) since the volume of water to be treated in the WWTPs and DWTPs is much larger than the volume of the landfill leachate and the PFAS concentrations in the WWTPs and DWTPs are lower than that in the leachate due to dilution.

Due to the strong C—F bond and low concentrations, PFAS are very difficult to degrade and to remove from water. Treatment technologies that have been demonstrated to be effective for their removal from drinking water include activated carbon, membrane filtration, anion exchange, and some advanced oxidation/reduction processes. Of the various advanced oxidation/reduction methods for PFOA (a model PFAS) degradation the highest energy yields, as shown in Table 1, are for non-thermal plasma in and over water, UV-activated persulfate, gramma radiation, and electron beams. Sonolysis, electrochemical, and UV photo reactors have the lowest efficiencies.

TABLE 1

Methods for PFOA (a model PFAS) Degradation

| Treatment | [PFOA]$_0$ (μM) | Energy yield ($10^{-11}$ · mol/J) | Main reactants |
|---|---|---|---|
| Plasma, in and over water | 20 | 45 to 140 | $e^-_{aq}$, $Ar^+$, $^-OH$ |
| Sonolysis | 20 | 2.4 | Pyrolysis, •OH |
| UV-activated persulfate | 50 | 43 | UV, $SO_4$•$^-$ |
| Electrochemical treatment | 0.031 | 0.059 | Electron transfer at electrode |
| DC plasma in $O_2$ bubbles | 100 | 3.3 | oxygen ions |
| Gamma radiation | 50 | 96 (pH 13) | •OH, $e^-_{aq}$ |
| UV photo reactor | 35 | 0.05 | Photogenerated $e^-_{aq}$ |
| Electron beam | 1.3 | 21 | $e^-_{aq}$ |

Plasma is an overall electrically neutral ionized gas that contains ions, radicals, and free electrons, and that is typically formed by high voltage electrical discharge. The specific reactive species generated in plasma depends upon the gas composition as well as the plasma properties (e.g., electron energy, electron density, plasma temperature) and electrode configurations and reactor design. Plasma processes have been widely used and commercialized for gas phase pollution treatment and ozone formation. There is a growing interest in plasma contacting liquid water for applications in environmental, chemical, biochemical, biomedical, and materials engineering. When plasma is formed in an atmosphere of a noble gas such as argon or helium, or with additional oxygen, in contact with liquid water, the major reactive species formed are $H_2O_2$, ·OH, ·H, various molecular, atomic and radical oxygen species (e.g., $O(^1D)$, $O_3$), and some ionic species, including, of major significance, the reducing species aqueous electrons ($e_{aq}^-$). These species react with the target compounds in the liquid, gas, and at the gas-liquid interface and may lead to partial degradation or complete mineralization. While most of the highly reactive species are consumed within or near the gas-liquid interface, other more stable compounds may transfer deeper into the bulk liquid where they may react further. An examples of such a plasma based system can be found U.S. Pat. No. 9,861,950 to Locke et al, the disclosure of which is fully incorporated by reference.

Aqueous electrons, $e^-_{aq}$, have been shown to be formed in such plasma reactors and it has been demonstrated that $e^-_{aq}$, a key chemically reducing species, is responsible for the degradation of PFOA when plasma is formed directly inside water with a negative electrode polarity discharge. When argon gas is sprayed through the electrode needle or gas bubbles are combined with a plasma discharge, then the combination of both $e^-_{aq}$, hydroxyl radicals and gas phase ions (putatavely positive argon ions) are responsible for the PFOA degradation. Typically the energy efficiency of plasma over a liquid surface is much higher than plasma generated directly inside the liquid. As shown in Table 1, energy yields are over 3.2 times better in these gas-liquid plasma reactors than in other advanced oxidation/reduction processes such as the UV-activated sulfate reactor. PFOA and PFOS degradation with direct current (DC) plasma discharges containing oxygen bubbles was suggested to occur through oxygen positive ion reactions. Gamma radiation is only highly efficient at very high, and impractical pH (13), and performance drops dramatically with lower pH.

SUMMARY OF THE INVENTION

A reactor system for reacting liquid phase chemical species in a liquid includes a reactor vessel for containing the liquid phase and a gas phase, and having a liquid-gas interface location within the reactor vessel. A pulsed discharge cathode and anode are provided for creating a pulsed discharge electric field at the liquid-gas interface location. A pulsed discharge power supply delivers a pulsed power input to the pulsed discharge cathode and anode, and thereby creates a plasma comprising ions at the liquid-gas interface location. A secondary electric field source directs a secondary electric field transverse to the liquid-gas interface. The secondary electric field will drive some of the ions from the gas phase into the liquid phase to react with the liquid phase chemical species. The ions can include negative ions, and the negative ions can include electrons. The secondary electric field source can include a direct current cathode and anode.

A method for reacting a liquid phase chemical species, can include the steps of providing liquid phase containing the liquid phase species, providing a gas phase, and providing a reactor vessel for containing the liquid phase and the gas phase. The liquid and the gas are placed in the reactor vessel so as to form a liquid-gas interface between the liquid phase and the gas phase within the reactor vessel. A pulsed discharge cathode and anode are provided for creating a pulsed discharge electric field at the liquid-gas interface. A pulsed power input is provided to the pulsed discharge cathode and anode, and thereby creates a plasma comprising ions at the liquid-gas interface. A secondary electric field is directed transverse to the liquid-gas interface, wherein the secondary electric field will drive some of the ions from the gas phase into the liquid phase to react with the liquid phase species.

The method can further include injecting gas bubbles into the liquid phase, wherein the bubbles will transport the liquid phase chemical species to the plasma at the liquid-gas interface. The gas can be ozone, wherein the ozone will react with the liquid phase chemical species as the liquid phase chemical species is transported to the liquid-gas interface. The method can also include the step of recirculating at least one selected from the group consisting of the liquid phase and the gas phase to the reactor vessel.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
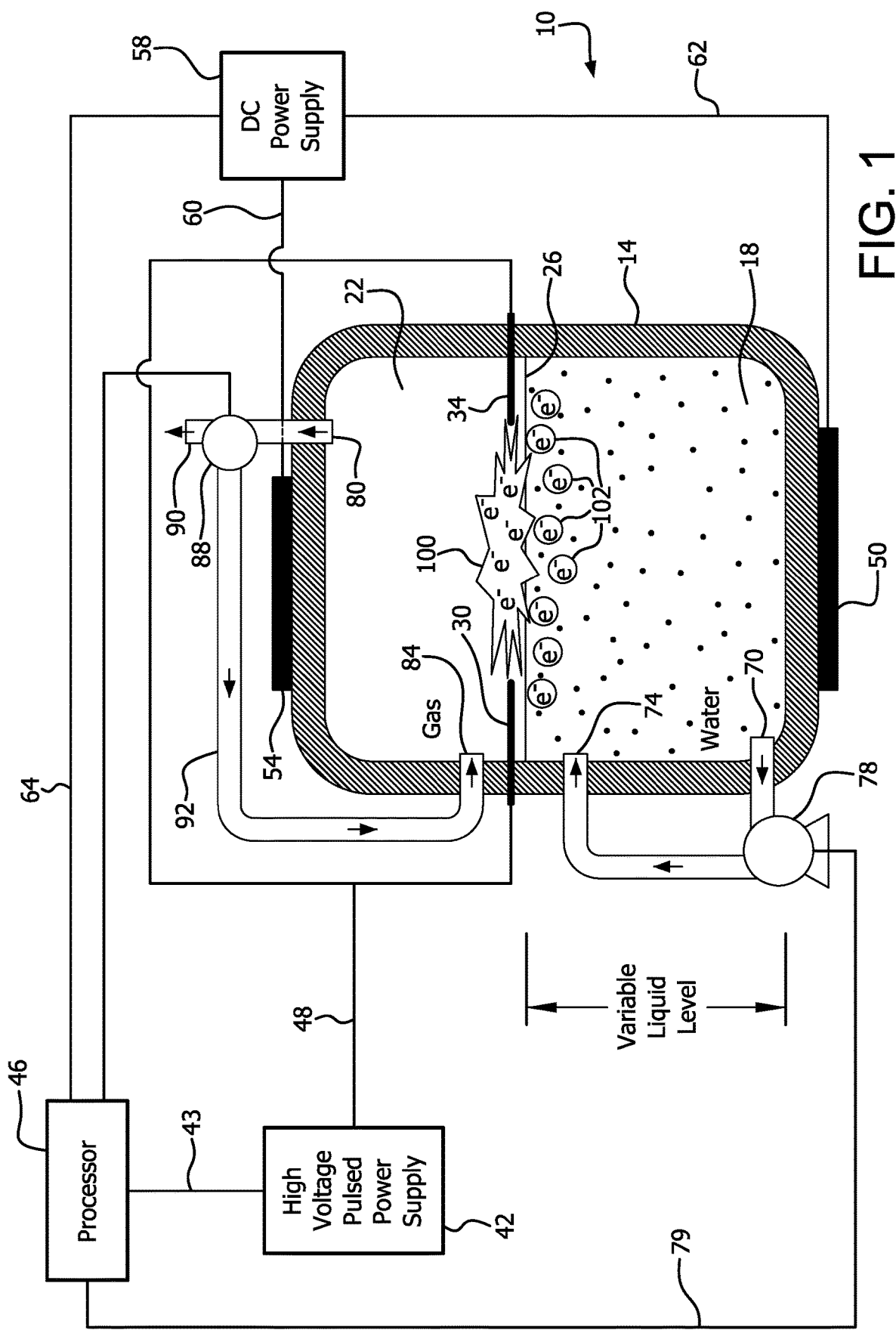
FIG. 1 is a schematic representation of a reactor system for reacting liquid phase chemical species.

A reactor system for reacting liquid phase chemical species in a liquid includes a reactor vessel for containing the liquid phase and a gas phase. The reactor vessel can have a gas injection port, a gas exit port, and a liquid-gas interface location within the reactor vessel. A pulsed discharge cathode and anode are provided for creating a pulsed discharge electric field at the liquid-gas interface location. A pulsed discharge power supply delivers a pulsed power input to the pulsed discharge cathode and anode, and thereby creates a plasma comprising ions at the liquid-gas interface location. A secondary electric field source is provided for directing a secondary electric field transverse to the liquid-gas interface. The secondary electric field will drive some of the ions from the gas phase into the liquid phase to react with the liquid phase chemical species.

The ions that are created in the plasma will be a function of the gas that it subjected to the pulsed discharge electric field. Many different ions are possible, including both positive and negative ions. The negative ions can be electrons, which when present in the liquid become highly reactive aqueous electrons. The gas phase can include at least one selected from the group consisting of nitrogen, oxygen, air, ozone, argon, and helium.

The liquid phase can include water. The water can contain a variety of different solutes and contaminants. The water can, for example, be waste water, landfill leachate, or ground water.

The pulsed electric field can be generally directed parallel to the liquid gas interface, in order that the plasma is formed along and close to the liquid-gas interface. The electrode position and angle relative to the liquid-gas interface surface should be such that the pulsed electric field travels along the liquid-gas interface. The orientation can vary, and the gap distance between the electrodes can vary. The gap distance between the pulsed electric field electrodes can in one embodiment be between 1-10 mm. The gap distance between the secondary electrodes can also vary, and in one embodiment can be between 1 and 10 cm.

The plasma discharge can have a frequency of from 100 Hz to 1 MHz. The plasma discharge frequency can be 100, 250, 500, 750, 1000, 2500, 5000, 7500, 10000, 25000, 50000, 75000, 100000, 250000, 500000, 750000 or 1000000 Hz, or can be within a range of any high value and low value selected from these values.

The field strength of the secondary electric field can vary. The secondary electric field strength can be from 10 to 1000 V/cm. The secondary electric field strength can be 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, and 1000 V/cm, or can be within a range of any high value and low value selected from these values.

The secondary electric field is generally transverse to the liquid-gas interface such that plasma ions and particularly electrons if present are driven from the plasma into the liquid. The secondary electric field can be perpendicular to the liquid-gas interface, or can be offset from the liquid-gas interface.

The invention can be used to react many different liquid phase chemical species. The at least one chemical species can be a compound subject to chemical reduction. The at least one chemical species can be a fluorinated organic compound. The fluorinated organic compound can be a per- or poly-fluoroalkyl organic compound.

The reactor system can include a gas injection port and a gas exit port. The reactor system can include a liquid injection port and a liquid exit port. The reactor system can include a recirculation conduit and a recirculation pump for recirculating at least one selected from the group consisting of the liquid phase and the gas phase from the reactor vessel. Recirculation can improve the conversion efficiency of the liquid phase chemical species and can conserve compounds from both the liquid and the gas phase.

The position of the pulsed discharge cathode and anode can vary. The pulsed discharge cathode and anode can be inside or outside the reactor vessel. The secondary electric field source can include a direct current cathode and anode. Other secondary electric field sources are possible. The direct current cathode and anode can be inside or outside the reactor vessel. If the secondary electric field cathode and anode are inside the reactor vessel, they can be made porous, as by forming them from a mesh or with through-passages, to permit fluid flow there through which might otherwise be exhausted from the system.

The gas injection port can be provided in different locations in the reactor vessel. The gas injection port can be configured to inject gas into the gas phase side of the liquid-gas interface. Alternatively, or in addition, gas injection can occur into the liquid. In one embodiment, a gas injection port can be configured to distribute gas bubbles into the liquid phase. Gas bubbles moving through the liquid will gather and transport some of the liquid phase chemical species to the plasma at the gas liquid interface location. Examples of such chemical species are chemical species with surfactant properties which will be attracted to the bubble-water interface, and volatile chemical species which can enter the gas phase of the bubble. As the bubbles rise, the liquid phase chemical species can accumulate at the bubble surface and will be transported with the bubble to the liquid-gas liquid interface, where there is a higher density of gas phase ions and aqueous ions such as aqueous electrons.

The reactor system can include a reactive gas source, wherein ozone bubbles or bubbles of another gas that is reactive or contains a compound that is reactive with the liquid phase chemical species will be introduced into the liquid phase to react with the liquid phase chemical species. These bubbles of reactive gas can be introduced substantially below the liquid-gas interface, such as at or near the bottom of the vessel, and will thereby rise through the liquid phase toward the liquid-gas interface. The reactive gas bubbles will react with the chemical species as the bubbles rise, such that some reaction of the chemical species will occur before the chemical species reaches the plasma ions or aqueous electrons. The bubbles can also collect and carry some of the liquid phase chemical species to the liquid-gas interface as the bubbles rise. This can result in a more thorough conversion of the liquid phase chemical species.

A method for reacting a liquid phase chemical species, includes the step of providing a liquid phase containing the liquid phase species, providing a gas phase, and providing a reactor vessel for containing the liquid phase and the gas phase. The liquid and the gas are placed in the reactor vessel so as to form a liquid-gas interface between the liquid phase and the gas phase within the reactor vessel. A pulsed discharge cathode and anode are provided for creating a pulsed discharge electric field at the liquid-gas interface. A pulsed power input is provided to the pulsed discharge cathode and anode, and thereby creates a plasma comprising ions at the liquid-gas interface. A secondary electric field is directed transverse, for example perpendicular, to the liquid-gas interface, wherein the secondary electric field will drive some of the ions from the gas phase into the liquid phase to react with the liquid phase species.

FIG. 1 is a schematic representation of a reactor system 10 for reacting liquid phase chemical species. The reactor system 10 includes a reactor vessel 14, which can contain a liquid 18 and gas 22, defining a liquid-gas interface 26. A pulse discharge cathode 30 and anode 34 can be positioned within the vessel 14 for creating a pulsed discharge electric field at the liquid-gas interface location, and can be positioned such that the pulsed discharge electric field is directed parallel to the liquid-gas interface, although other orientations are possible. A pulsed discharge power supply 42 is provided for delivering a pulsed power input through line 48 to the pulsed discharge cathode 30 and anode 34, thereby creating a plasma 100 comprising ions at the liquid-gas interface location 26. A processor 46 can be provided to control operation of the high-voltage pulsed power supply 42 through a wired or wireless communications line 43.

A secondary electric field source can be provided for directing the secondary electric field transverse, for example perpendicular, to the liquid-gas interface location 26. The secondary electric field source can include a direct current cathode 50 and anode 54. A DC power supply 58 can provide direct current through line 60 to the direct current anode 54 and through line 62 to the direct current cathode 50. A line 64 which can be wired or wireless can be provided to permit communication and control between the processor 46 and the DC power supply 58. Recirculation of the liquid and the gas phase is possible. A liquid recirculation inlet 70 and a recirculation outlet 74 can be provided. A pump 78 can be provided to recirculate liquid as necessary, which can be controlled by the processor 46 through a wired or wireless communications line 79.

A gas exit 80 from the vessel 14 is provided and a gas inlet 84 can also be provided. The gas outlet 80 can communicate with an exhaust conduit 90 through a valve or pump 88. When gas recirculation is desired, control of the valve 88 can direct recirculating gas through recirculating gas line 92 to the gas inlet 84. The gas inlet 84 can also be utilized to introduce new gas into the vessel 14.

Operation of the secondary electric field will cause electrons from the plasma 100 to be driven across the liquid-gas interface 26 into the liquid 18 as aqueous electrons 102. These aqueous electrons are highly reactive even towards liquid phase chemical species such as per- or poly-fluoroalkyl compounds.

Figure 2:
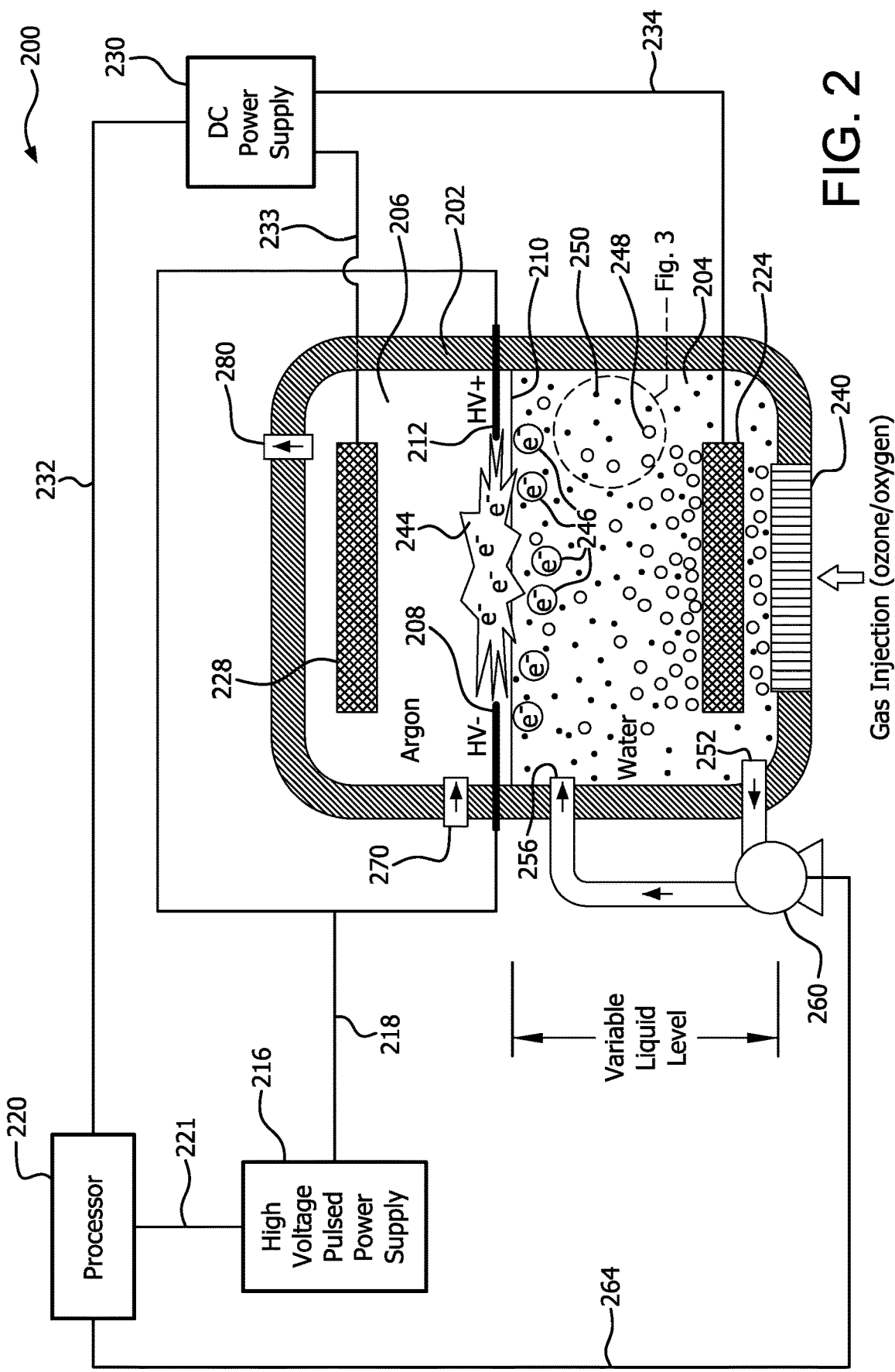
FIG. 2 is a schematic representation of an alternative embodiment of a reactor system for reacting liquid phase chemical species.

There is shown in FIG. 2 an alternative embodiment comprising a reactor system 200. The reactor system 200 includes a vessel 202 for containing a liquid phase 204 and a gas phase 206 defining a liquid-gas interface location 210. A pulsed discharge cathode 208 and anode 212 can be connected to a high voltage pulsed power supply 216 by line 218 so as to deliver a pulsed power input to the pulsed discharge cathode 208 and anode 212, thereby creating a plasma 244 comprising ions at the liquid-gas interface location. The high voltage power supply 216 can be connected to a processor 220 by a line 221 which can be wired or wireless, such that communication and control with the high voltage power supply 216 is enabled.

A secondary electric field source can be provided for directing a secondary electric field transverse to the liquid-gas interface. The secondary electric field source can include a direct current cathode 224 and anode 228, which can be connected to a direct current power supply 230 through a line 233 and a line 234. The secondary electric field will act to drive electrons across the liquid-gas interface 210 such that aqueous electrons 246 will accumulate in the liquid 204 near the liquid-gas interface 210. The DC power supply 230 can be connected to the processor 220 by a wired or wireless line 232 to provide communication and control. Gas can be introduced into the vessel 202 through a gas inlet 270 and can exit through the gas outlet 280. The liquid 204 can be recirculated through a liquid outlet 252 and a liquid inlet 256 with a pump 260. The pump 260 can be connected by a wired or wireless communications line 264 to the processor 220 to provide communication and control.

Figure 3:
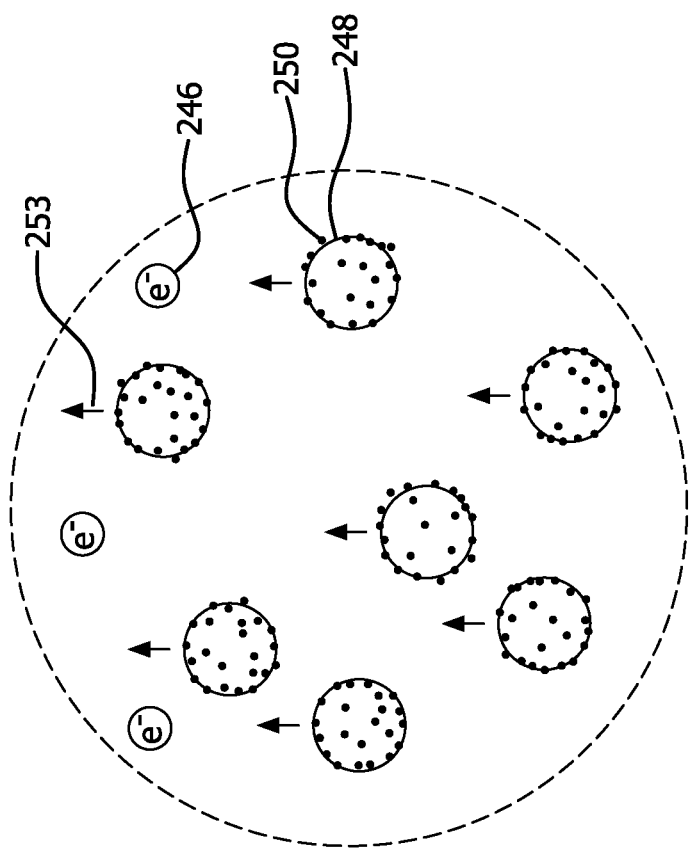
FIG. 3 is an enlargement of area FIG. 3 in FIG. 2.

Gas injection can also be performed through the gas inlet 240 that acts to distribute bubbles 248 in the liquid 204 which rise to the liquid-gas interface 210. As shown by the enlargement in FIG. 3, these bubbles 248 can accumulate contaminant 250 at the bubble-liquid interface and carry the contaminant 250 toward the plasma and the aqueous electrons 246 as the bubbles 248 rise in the direction shown by arrow 253. The gas can be comprised of a reactive compound such as ozone, which will react with the contaminant and thereby provide some contaminant removal in addition to that which derives from contact between the contaminant and the aqueous electrons 246 and plasma 244 at the liquid-gas interface 210. The direct current cathode 224 and anode 228 can be formed from a porous material or have through-holes to facilitate the passage of gas through the cathode 224 and anode 228.

Figure 4:
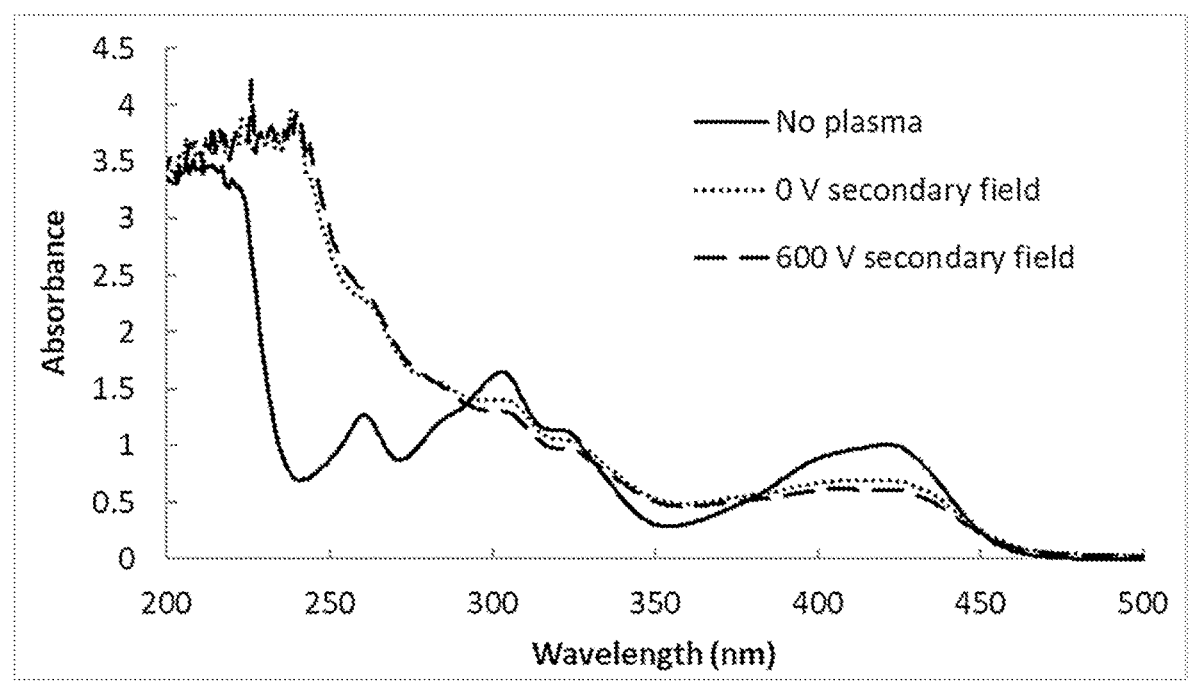
FIG. 4 is a plot of absorbance vs. wavelength (nm) for reactions with no plasma, 0 V secondary field, and 600 V secondary field.

To test the effect of the secondary electric field, ferrocyanide dye was utilized. Ferrocyanide is a water-soluble dye that is highly susceptible to reduction by electrons. 24 mL of a 1 mM dye solution was added to the reactor. Initial and final dye concentration was determined by UV-vis absorbance at 420 nm. In this configuration argon was used as the working gas, the primary pulsed electric field was delivered at 18 kV with a 100 ns pulse width and 3 kHz repetition frequency with a primary electrode gap distance of 0.2 cm. The secondary electrode gap distance was set to 3 cm and the applied voltage modulated to 0 and 600 Vdc. With no secondary electric field (0 Vdc) the dye concentration was reduced by 31% after 15 minutes of treatment. As shown in FIG. 4, when 600 Vdc was applied across the secondary electrodes the dye reduction increased to 39% with all other conditions held constant. This corresponds to a 25% increase in dye reduction when the secondary electric field was applied.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular aspects of the systems and methods described herein and is not intended to be limiting of the disclosure. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising." Unless otherwise defined, all terms (including technical and scientific terms) used herein have the same meaning as commonly understood by one of ordinary skill in the art to which this invention belongs.

We claim:

1. A method for reacting a liquid phase chemical species, comprising the steps of:
providing liquid phase containing the at least one liquid phase chemical species;
providing a gas phase;
providing a reactor vessel for containing the liquid phase and the gas phase;
placing the liquid phase and the gas phase in the reactor vessel so as to form a liquid-gas interface between the liquid phase and the gas phase within the reactor vessel;
providing a pulsed discharge cathode and anode for creating a pulsed discharge electric field at the liquid-gas interface;
providing a pulsed power input to the pulsed discharge cathode and anode, and thereby creating a plasma comprising ions at the liquid-gas interface;
directing a secondary electric field transverse to the liquid-gas interface, wherein the secondary electric field will drive some of the ions from the gas phase into the liquid phase to react with the liquid phase species.

2. The method of claim 1, wherein the ions are negative ions.

3. The method of claim 2, wherein the negative ions are electrons.

4. The method of claim 1, wherein the secondary electric field is created by a direct current cathode and anode.

5. The method of claim 1, wherein the gas comprises at least one selected from the group consisting of nitrogen, oxygen, air, ozone, argon, and helium.

6. The method of claim 1, wherein the at least one liquid phase chemical species is a compound subject to chemical reduction.

7. The method of claim 1, wherein the at least one liquid phase chemical species is a fluorinated organic compound.

8. The method of claim 7, wherein the fluorinated organic compound is a per- or poly-fluoroalkyl compound.

9. The method of claim 1, wherein the liquid comprises water.

10. The method of claim 1, wherein the pulsed power input has a frequency of from 100 Hz to 1 MHz.

11. The method of claim 1, further comprising a step of recirculating at least one selected from the group consisting of the liquid phase and the gas phase from the reactor vessel.

12. The method of claim 1, wherein the secondary electric field is perpendicular to the liquid-gas interface.

13. The method of claim 1, wherein the secondary electric field is from 10 to 1000 V/cm.

14. The method of claim 1, further comprising injecting gas bubbles into the liquid phase, wherein the bubbles will transport the liquid phase chemical species to the plasma at the liquid-gas interface.

15. The method of claim 14, wherein the gas is ozone, and wherein the ozone will react with the liquid phase chemical species as the liquid phase chemical species is transported to the liquid-gas interface.

16. The method of claim 1, further comprising a step of recirculating at least one selected from the group consisting of the liquid phase and the gas phase to the reactor vessel.

17. The method of claim 1, wherein the secondary electric field is perpendicular to the liquid-gas interface.

18. The method of claim 1, wherein the pulsed discharge electric field is directed parallel to the liquid-gas interface.

19. The method of claim 1, further comprising a step of injecting and removing gas from the reactor vessel, while injecting and removing liquid from the reactor vessel.

\* \* \* \* \*